(12) United States Patent　　(10) Patent No.: US 8,345,054 B2
Gustin et al.　　(45) Date of Patent: Jan. 1, 2013

(54) METHOD AND SYSTEM FOR ADDRESSING DIGITAL RENDERING DEVICES

(75) Inventors: Emmanuel Gustin, Saint Quay Perros (FR); Bertrand Bouvet, Perros-Guirec (FR)

(73) Assignee: France Telecom, Paris (FR)

( * ) Notice: Subject to any disclaimer, the term of this patent is extended or adjusted under 35 U.S.C. 154(b) by 716 days.

(21) Appl. No.: 12/201,658

(22) Filed: Aug. 29, 2008

(65) Prior Publication Data

US 2009/0058869 A1　Mar. 5, 2009

(30) Foreign Application Priority Data

Aug. 30, 2007　(FR) ..................... 07 57270

(51) Int. Cl.
　　*G06F 13/14*　　(2006.01)
　　*G06F 15/173*　　(2006.01)
(52) U.S. Cl. ...................... 345/520; 709/225
(58) Field of Classification Search .............. None
See application file for complete search history.

(56) References Cited

U.S. PATENT DOCUMENTS

| 6,957,275 | B1 | 10/2005 | Sekiguchi | 709/245 |
|---|---|---|---|---|
| 7,136,837 | B2* | 11/2006 | Jackson et al. | 705/52 |
| 7,506,054 | B1* | 3/2009 | Fuh et al. | 709/225 |
| 2006/0026076 | A1* | 2/2006 | Raymond | 705/26 |
| 2006/0170705 | A1* | 8/2006 | Wilson | 345/628 |

FOREIGN PATENT DOCUMENTS

WO　　WO 01/42953　　6/2001

OTHER PUBLICATIONS

French Search Report from counterpart foreign Application No. FR 07/57270.

\* cited by examiner

*Primary Examiner* — Ryan R Yang
(74) *Attorney, Agent, or Firm* — David D. Brush; Westman, Champlin & Kelly, P.A.

(57) ABSTRACT

A method is provided for updating a data-rendering device connected to a communications network by an intermediate device. A specific electronic address is assigned to the data-rendering device. The method includes associating at least one identifier, preliminarily assigned to the intermediate device, with the electronic address. The at least one identifier belongs to the group including at least: one dynamic connection identifier of the intermediate device and one user account identifier (AID).

11 Claims, 7 Drawing Sheets

METHOD AND SYSTEM FOR ADDRESSING DIGITAL RENDERING DEVICES

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of the digital rendering of user data and especially to the addressing of rendering devices of this kind, for example "photo" frames.

Recent technological developments in digital data rendering, especially by means of LCD or plasma screens, have enabled the creation of new devices known as "photo frames". At present, such devices do not just display digital photographs but are also capable of rendering sound or musical data and even receiving digital signals from broadcasters, for example through terrestrial digital networks.

Other rendering devices may also take the form of hi-fi system type music broadcasting systems which are capable of rendering musical files.

Recently, devices of the above mentioned type have been given network connectivity functions. This kind of connectivity is chiefly implemented by means of a WiFi (Wireless Fidelity) module enabling the device in question to link up to a private network of the user in order to refresh the contents to be rendered on the digital rendering device. These rendering devices are therefore gradually entering the domain of communicating objects, i.e. objects, which can easily take advantage of the method of the present disclosure.

BACKGROUND OF THE DISCLOSURE

The principles of refreshing proposed by prior-art techniques are based on access, either unified or through "proprietary" software, to a storage space from which the device will draw data to be rendered (mainly photographs, in the case of digital frames). The techniques proposed therefore frequently consist of the shifting, within the user's network, of the storage space accessible to the frame. In order that the new storage location may be used, it is unfortunately often necessary for another of the user's devices to remain powered on as well. Indeed, in order that the device, for example a frame, may be able to access the storage space through its wireless connection, it is necessary for this storage space to be permanently available to this frame. This very often means that the user's personal computer, which constitutes this storage space, will be permanently powered on.

Other techniques, especially based on address translation, enable such rendering devices to access a storage space situated on a specific server through the Internet. These mechanisms are based on a complex parametrizing of the device. Indeed, to enable the device to access the remote storage space, the user must enter a URL (Universal Resource Locator) as well as at least one identifier and one password in this device. The rendering device is then able to link up by itself to the storage space and render the data stored therein.

These techniques have several drawbacks, among them the complexity of parametrizing the rendering device, which leads to an almost routine rejection on the part of the users. Indeed, for the user who is normally informed of these technologies, the fact of making numerous entries causes the configuration phases to be even more tedious. Furthermore, in the event of a malfunction or a resetting of the devices, a user who has not taken the trouble to preserve the parameters in order to re-enter them is forced to re-create his account or else login to online services in order to retrieve his identifiers. This is always a source of difficulty.

Another drawback of these prior-art techniques is related to the fact that the entry operations made by the users are not secured. Thus, the user can be subjected to attacks designed to retrieve his passwords or his identifiers through these devices.

Yet another drawback of these prior-art techniques relates to the feeding of the storage space. Indeed, when this storage space is situated in the user's network, the feeding is done through the addition of contents, often manually, following the emptying of a memory card of the camera for example. When the storage space is situated in a remote server, the feeding of data is done by the loading, from an Internet browser, of the contents in the user's possession from his personal computer. There are therefore several steps in addition to that of emptying the memory card, including the tedious and difficult steps of selection and loading.

Furthermore, the interesting feature of these online storage spaces is the fact that they enable other users, with whom the user possessing the rendering device is in contact, to perform their own loading operations in order that the user of the device might derive benefit from them. Now, prior to these loading operations, the other users must obtain identification codes from the user of the device, enabling them to load the contents that they wish to download. Again, these codes are easily lost or forgotten and, owing to the complexity of the operations needed, the users cannot or will not wish to provide the user of the device with fresh contents.

Another drawback of these prior-art mechanisms is that the online services are provided mainly by the manufacturers of said rendering devices. This means that the permanence of the services provided is not ensured and it is prejudicial to the user that he should be unable to use a function of the device if the provider decides to no longer provide the service of online storage of the contents to be rendered.

SUMMARY

The solution proposed by an aspect of the present disclosure does not have these drawbacks of the prior art. Indeed it relates to a method for addressing a data-rendering device connected to a communications network by means of an intermediate device characterized in that comprises:
  a step for obtaining an electronic address specific to said rendering device;
  a step for associating at least one identifier, preliminarily assigned to said intermediate device, with said electronic address.

Thus, an aspect of the present disclosure removes the need to enter information into the rendering device. Indeed, unlike the prior-art techniques, the method of the present disclosure does not necessitate the entry into the rendering device of the address (for example an electronic mail address or email address) assigned to the rendering device in order that it may be capable of rendering the data. Indeed, the rendering device by itself acquires an address enabling it to ensure the subsequent reception of data to displayed. The method therefore provides for greater security in the use of this type of rendering device while at the same time limiting operations required from the user, since this user does not have to enter information or remember information entered if ever the device should be damaged or need to be changed. At the same time, the system is more reliable since the user is certain of not having his email address "stolen" by another device belonging to another user since the email address is directly linked to an identifier of the intermediate device (such as a residential gateway), for example his public IP address, this IP address being assigned only after authentication of the intermediate device with an authentication server, for example of the Radius type.

The intermediate device may be a residential gateway as such when the rendering device is a photo frame or any other type of terminal situated in a user's private network, possessing its own addressing space. In other applications, the intermediate device may be included for example in the network of a communications operator if the rendering device is of another type, for example a mobile personal assistant.

In one particular embodiment, said at least one preliminarily assigned identifier belongs to the group comprising at least:
  one public IP address of said intermediate device;
  one user account identifier (AID).

According to a particular embodiment, said method comprises:
  a preliminary step for obtaining said public IP address by using said account identifier (AID) of said user associated with a connection of said intermediate device to said wide area network;
  a step for the storing, within an entity of said wide area network, of a set of digital data comprising at least said public IP address and said account identifier of said associated user.

Thus, an aspect of the disclosure makes it possible to avoid overloading devices which are responsible for assigning user account identifiers, for example "Radius type" authentication servers, by carrying out a storage, at the very least temporarily, of the IP address of the user's intermediate device (for example a residential gateway) and of the user account identifier to ensure that the subsequently executed step for obtaining the electronic address does not necessitate a search for data in other places. Thus, the execution of the addressing method is centralized at the same time as the processing load to be imposed on the related apparatuses is diminished.

According to one particular embodiment, said method comprises, subsequently to said step of association:
  a step for verifying the existence of a message associated with said mail address, delivering an information on existence;
  a step for transferring an item of information representing said information on existence to a storage space accessible to said rendering device.

Thus, after the mail address has been obtained, an aspect of the disclosure enables the reception, within the rendering device, of at least one indication of presence of a message. The rendering device is therefore capable, through the method of the disclosure, of displaying an item of information representing a presence of a message.

According to one particular characteristic, said piece of representative information is a file that can be rendered on said rendering device and represents said message.

Thus, unlike in the methods of the prior art, the rendering device does not need to login to an Internet site specifically dedicated to the centralized storage of digital data. Indeed, the prior-art techniques and especially the WiFi type photo frames possess wide area connectivity capacities that result from a verification, at regular intervals, of the contents available at a specific URL on the Internet. This URL and the private connection information of the user should be entered by the user. If the service offered in partnership with the purchase of the photo frame is not available, or if the data cannot be displayed, the photo frame displays nothing.

The method of the disclosure differs from previous methods in that, in the operator network, it associates a specific mail address with the rendering device. The user therefore has to enter only one access URL to a server at the device. The method of the disclosure takes over the task of performing the operations needed for the display, by the rendering device, of the messages received at this address.

In one particular embodiment, the URL providing access to a server may be preliminarily configured within the rendering device. In another embodiment, the access URL may be preliminarily obtained by the rendering device through the residential gateway, thus preventing any entry from being made by the user and ensuring that this address can be updated by the service provider at the residential gateway.

An aspect of the disclosure also has the advantage of being independent of the rendering device considered. Indeed, the prior-art techniques closely link the rendering device to a specific online service. An aspect of the disclosure overcomes this drawback by allowing any device whatsoever, having a capacity to obtain data on a private network of a user, to obtain such data, even when this data is located in a network external to the user's network.

An aspect of the disclosure also pertains to a telecommunications system including a data-rendering device connected to a communications network by means of an intermediate device characterized in that comprises:
  means for obtaining an electronic address specific to said rendering device;
  means for associating at least one identifier, preliminarily assigned to said intermediate device, with said electronic address.

An aspect of the disclosure also pertains to a device for addressing a data-rendering device connected to a communications network by means of an intermediate device.

Such a device comprises:
  means for obtaining an electronic address specific to said rendering device;
  means for associating at least one identifier, preliminarily assigned to said intermediate device, with said electronic address In other embodiments, a device of this kind comprises complementary means for updating the addressing method as described here above.

According to a particular embodiment, a device of this kind can be integrated into a residential gateway, for example to prevent the creation and management of a new entity responsible for implementing the method within communications networks.

According to another aspect, the disclosure also concerns a computer program product downloadable from a communications network and/or stored in a computer-readable carrier and/or executable by a microprocessor and comprising program code instructions for the execution of the addressing method as described here above.

BRIEF DESCRIPTION OF THE DRAWINGS

Other characteristics and advantages shall appear more clearly from the following description, given by way of a non-exhaustive and illustrative example and from the appended drawings of which.

DETAILED DESCRIPTION OF ILLUSTRATIVE EMBODIMENTS

An aspect of the present disclosure simplifies and secures the operations of content retrieval. Indeed, an aspect of the disclosure prevents the need for numerous entries, both for the user who has to configure a device and for the contributors, namely users who wish to provide content to the device so that it renders this data to them.

To this end, an aspect of the disclosure implements an authentication of the rendering device by another apparatus of the user.

An apparatus of this kind may be constituted for example by a "residential gateway" enabling apparatuses of the user's private network to communicate with a wide area network (WAN). This gateway permits outgoing communications by means of a mechanism known as NAT (Network Address Translation) used to achieve a translation of the private addresses of the devices wishing to communicate with the exterior by the public address of the residential gateway. However, the context of the present disclosure is not that of this address translation mechanism. Indeed, there are numerous apparatuses that make use of address translation, as is the case with the prior art rendering devices mentioned here above.

An aspect of the disclosure on the contrary minimizes the user's interactions by carrying out an automatic recognition of the rendering device even when it does not have the capacity to provide any identifier or password for example.

Figure 1:
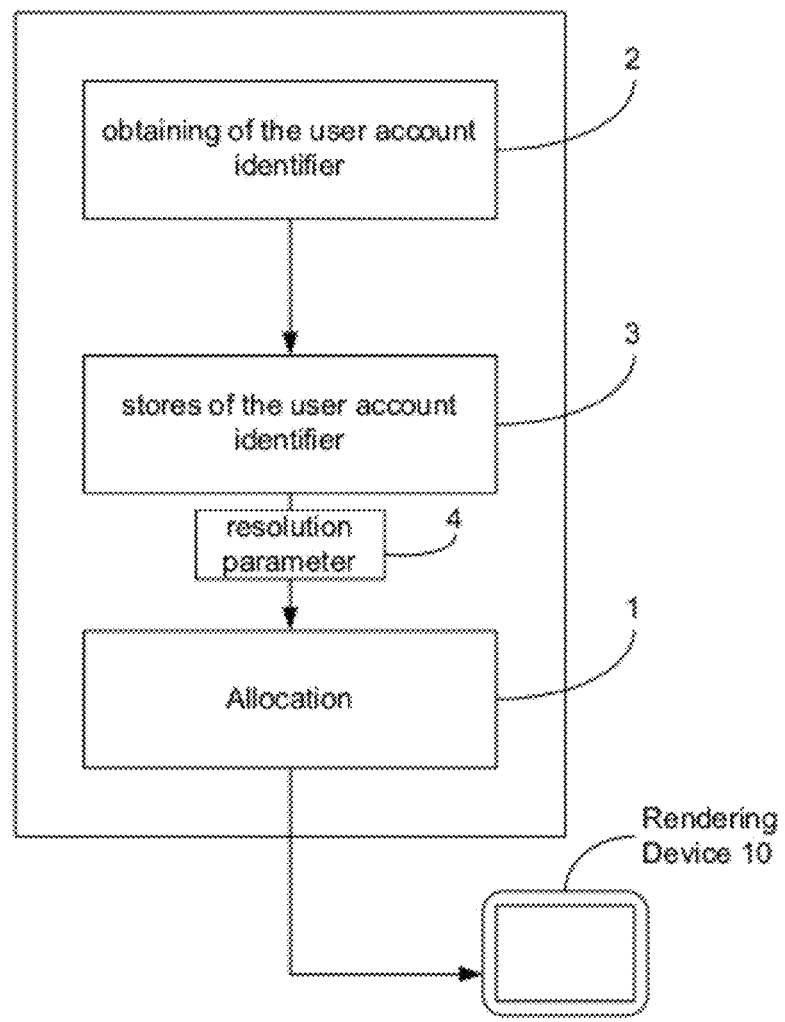
FIG. 1 is a block diagram showing the method.

Referring to FIG. 1, a description is provided of the general principle of the method of the present disclosure. The method minimizes intervention by the user. Such a possibility is offered by means of an allocation (1) of a specific and definitive mail address to the rendering device 10 by means of a resolution parameter 4 assigned beforehand to the residential gateway. The obtaining of the mail address therefore enables the device to become addressable. In other words, it is the data possessed by the residential gateway and not data entered by the user that will enable the rendering device 10 to access the contents to be rendered. This characteristic provides for the simplicity and security of the entire addressing method.

The retrieval, during the implementation of the method, of the email address assigned to the rendering device may be done by means of at least two parameters: the public address of the residential gateway as well as the identifier of the user account. This user account identifier (also called AID for Account IDentifier) is a value obtained when the residential gateway is started up, after it has been the object of an identification, for example by means of an "Radius" type authentication server.

Now it can be the case that such a value is not directly accessible. An aspect of the disclosure resolves this problem through the obtaining (2) of the user account identifier from an apparatus which associates this account identifier with the IP address of the gateway. In this embodiment, this obtaining (2) is done prior to the retrieval of the mail address. Indeed, the current state as regards the implementing of residential gateways, and more generally of high-bit-rate Internet connections, the IP addresses assigned by the operators may be dynamic. This means that an IP address is assigned whenever the modem or the gateway is reset. However, the duration for which these IP addresses are assigned may vary to attain values which may, for example, be twenty-four hours. Thus, at regular intervals, the IP address dynamically assigned to an apparatus (gateway or modem) is renewed. The association between the user account identifier and the IP address of the gateway is therefore regularly modified. Thus, a rendering apparatus, such as a photo frame, does not have any fixed IP address which may enable it to be directly addressed from the network of the operator through an address translation mechanism for example. Furthermore, all the terminals situated behind a modem/ADSL access router are in private addressing mode, on the user's private network: their addresses are allocated by this apparatus and the terminals may have fixed private IP addresses since they are locally allocated by the modem/router.

To prevent the need to constantly obtain the user account identifier from the appropriate apparatus, the method stores (3) this information once it has been obtained. This temporary storage therefore saves the resources of the apparatuses of the operator's network.

In other words, the method enables the association of a mail address with a device that does not have this addressing capacity through the use of information available through the public IP address of the equipment used to access the operator's network. The method does resolve at least two problems: that of the inability of certain rendering devices to possess a mail address and that of the security loopholes presented by these rendering devices. Furthermore, if a change of a photo frame should occur (for example in the event of a failure), the method ensures that there is no need for a fresh reconfiguration for the replacement photo frame.

Here below, we shall present inter alia the case of an implementation of the method adapted to the rendering of digital images on devices known as "digital frames". It is clear however that the method is not limited to this particular application but can also be implemented in many other configurations, for example in the case of a sound rendering device such as a hi-fi system having network connection functions and more generally in all cases where the advantages listed are worthwhile.

In this embodiment, we present an implementation of the method for the display of digital photographs in a photo frame having network connectivity, for example by means of a WiFi module capable of sending out HTTP (HyperText Transport Protocol) queries to a web server. In this embodiment, the implementation of the method enables a digital frame to receive and display MMS (Multimedia Message Service), SMS (Short Message Service) messages and email.

At present, MMS, SMS and e-mail messages can be sent to terminals (mobile terminals, GSM, analog terminals, DECT, personal computers etc) provided that these terminals are publicly addressable (terminals having a public telephone number or attached to a valid e-mail address). In other words, these terminals must have a known public address.

Other terminals having display capacities (electronic photo frames, multimedia devices) are also connected to the Internet (via modems and modem/router of the "residential gateway" type using wire mode, Ethernet, WiFi or again Bluetooth etc). These terminals at present cannot be publicly addressed and therefore cannot be used to receive and display MMS/SMS/email messages sent by classic terminals (GSM, personal computers etc).

The implementation of the method makes it possible to link up to devices that are currently not addressable and connected by wire connections or radio connections to the Internet IP network through modems or modems/routers that are publicly addressable. The operation is achieved without any additional configuration of the rendering device. These devices can then be used as display means and thus enable the reception of MMS, SMS or email messages. The devices are called "non-addressable" devices because they do not have any mail addresses and not because of the absence of addresses enabling connection to a personal network (such as an IP address assigned for example by a residential gateway in DHCP mode).

In this embodiment, the implementation of the method requires preliminary allocation of an email address to each terminal that is not publicly addressable by means of a service provider. This service provider enables a user to associate an email address with a photo frame. For example, a customer having an electronic photo frame can have an email address, such as "0123456789@frame.serviceprovider.com, where the number 0123456789 corresponds for example to the STN telephone line on which the customer's terminal installation is connected to the Internet (ADSL access).

In one variant of this embodiment, another addressing solution can also be obtained by assigning an SIP (Session Initialization Protocol) address to the terminal with a screen. In this case, the access modem (the residential gateway) sets up a correspondence between the web queries and the SIP queries.

Figure 2:
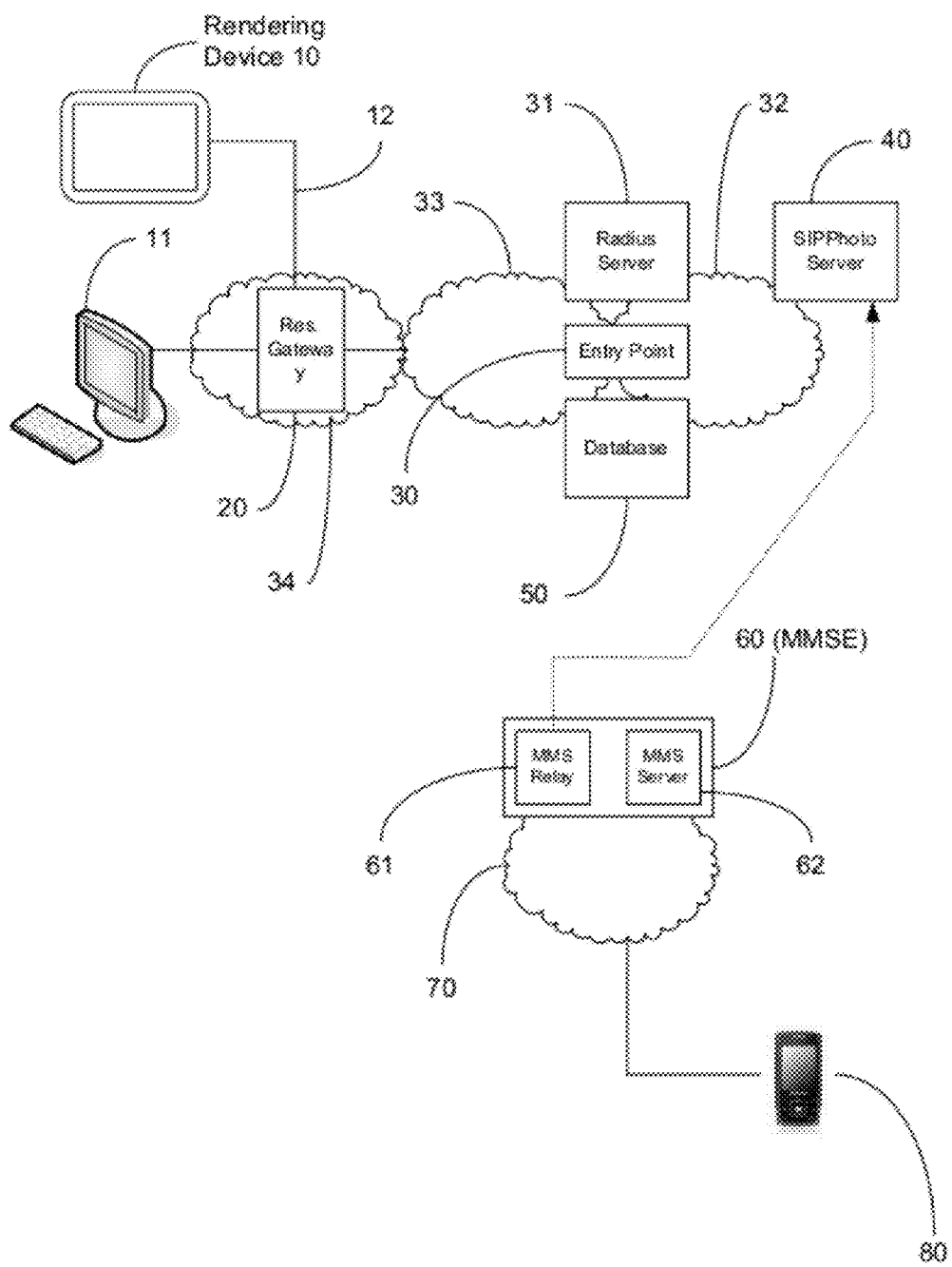
FIG. 2 illustrates the functional architecture enabling an implementation of the method.

Referring to FIG. 2, a description is provided of the functional architecture enabling a mobile terminal 80 to send an MMS to the electronic photo frame 10 connected to the Internet 32 via a network connection 12 with a residential gateway 20.

In this embodiment, the method relies on the following technical elements for its implementation:
- an installation with the user of the residential gateway 20 (acting as an ADSL modem-router), a personal computer 11 connected to the IP network through the Ethernet, the electronic photo frame 10 connected to the Internet 32 through a connection 12 with the residential gateway;
- an access network 34, for example of the ATM type;
- ATM or Ethernet Giga collection networks 33;
- an entry point 30 into the IP network of the Internet provider (BAS) in the case of an ATM collection network;
- a Radius server 31 of the Internet provider enabling the authentication of the user during the connection of the residential gateway 20 to the Internet 32 (validity check on identifier/Internet password);
- a database 50 for associating the public IP address of the gateway 20 with the customer identifier (AID). This database may be accessed by means of an appropriate server. Within the database, the address of the Internet customer is memorized during the authentication phase. In France, the IP address may be allocated for a maximum duration of twenty-four hours using the PPPoE (point-to-point protocol over Ethernet). Beyond this period, the network allocates a new IP address and as well as its customer identifier or AID (Account Identifier) retrieved during the Radius authentication phase;
- the mobile network 70 provided with its MMSE (Multimedia Service Environment) 60 consisting of a MMS (MMSC) server 62 and a MMS relay server 61;
- the mobile terminal 80 associated with the mobile network enabling the sending of MMS messages (photos, video, sound etc).

In this embodiment, the method of the disclosure uses a method for associating the IP address with the AID (Account Identifier) customer identifier in a database 50 for associating the public IP address of the gateway 20 with the customer identifier (AID) to circumvent the problem of the private IP address provided to the non-addressable frame by the modem/router (residential gateway) during the DHCP connection and thus circumvent the problem of the NAPT IP (Network Address and Port Translation).

The method thereafter uses a mechanism known as a "Web polling" mechanism enabling automatic refreshing, at desired time intervals, for the consultation of a storage space by the digital frame. The method enables the replacement of the simple storage space (prior art techniques) by an email reception box and the display of the content of the messages present in this box. Thus, instead of replacing the classic storage space, the method enables the frame to display the content of email messages.

In this embodiment, a specific entity of the operators network implements the method. The entity added in the context of this disclosure is a server known as SIPhoto which is connected to the IP network of the operator of the service or to the Internet. This server is formed by the following functional entities:
- a Web server;
- a database enabling the storage of the email address allocated to the frame type terminal (0123456789@frame.serviceprovider.com) and the customer's identifier AID with the service provider;
- an SMTP type email server
- a supply interface module enabling the information system to create the email address allocated to the frame and store it with the AID at the SIPhoto database;
- a supervision and tracing module for the administration of the system.

Figure 3:
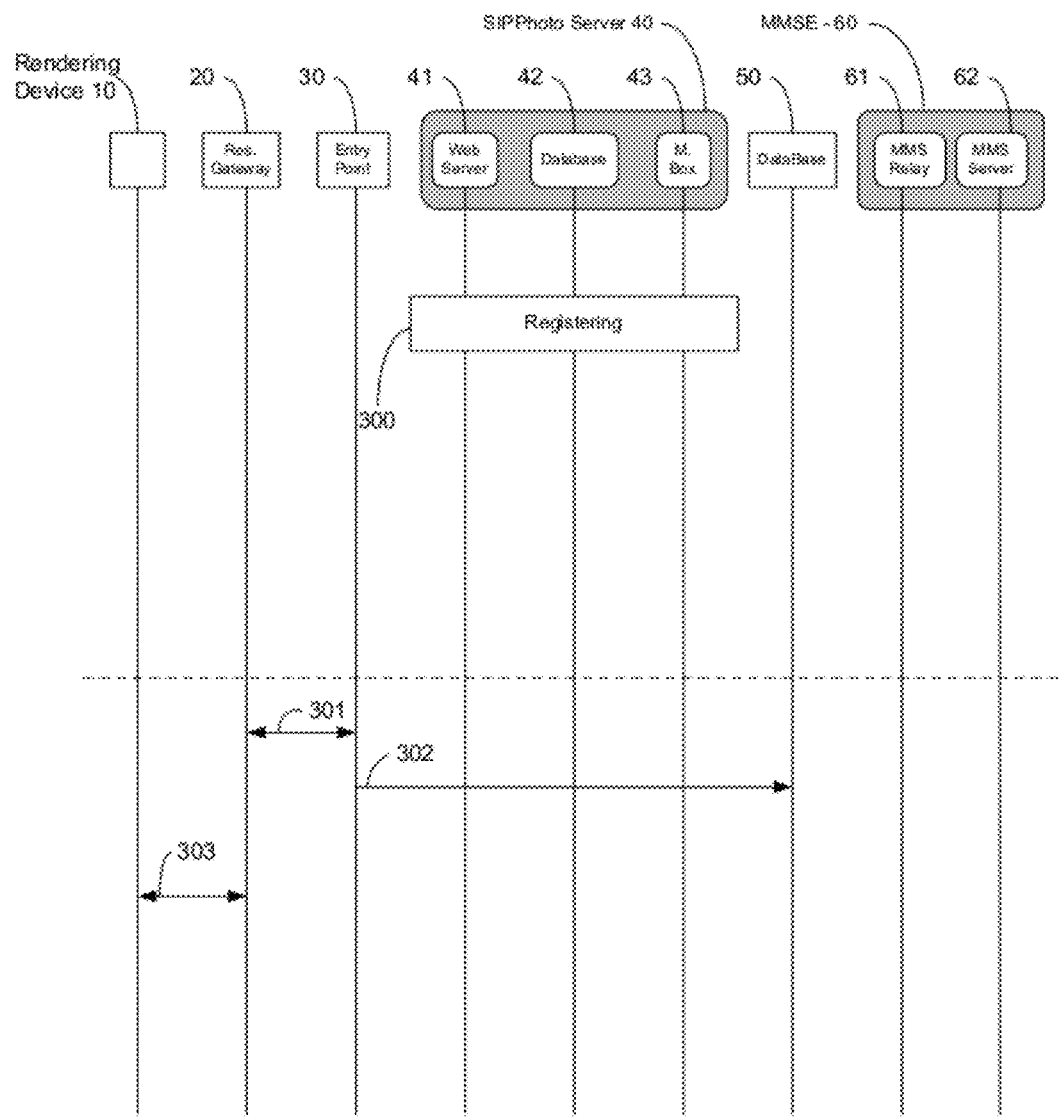
FIG. 3 describes the phases of subscribing to and registering with the service.

Referring to FIG. 3, a description is given of the dynamics of operation for the preliminary phases of registering with the service and of logging in to the Internet:
- when registering (300) with the service, the user already has an Internet subscription. He is therefore known to the information system and has a user account identifier (AID). A number (for example a number E164) is associated with the frame 10. This may be the number of the STN (Switch Telephone Network) telephone line or else a number of a dedicated section such as the 087 or 097 used for VoIP. The information system feeds the database (DB) 42 of the SIPhoto server 40 with two pieces of information: the AID client identifier and the number E164. This number is used to form the beginning of the email address which will be assigned to the frame.
- when setting up (301) the PPPoE session for the Internet connection of the gateway 20 with the BAS 30, the associating database 50 is updated (302) with the correspondence {AID; @ public IP assigned to the gateway} (in France, a new IP address is automatically assigned every 24 hours except when there is a specific Internet subscription with a fixed IP address);
- when the frame 10 is powered on, it sets up (303) a DHCP session with the DHCP server of the gateway 14. A private IP address is assigned to it (the same mechanism is when a PC accessing the Internet is linked up via Ethernet/WiFi).

Figure 4:
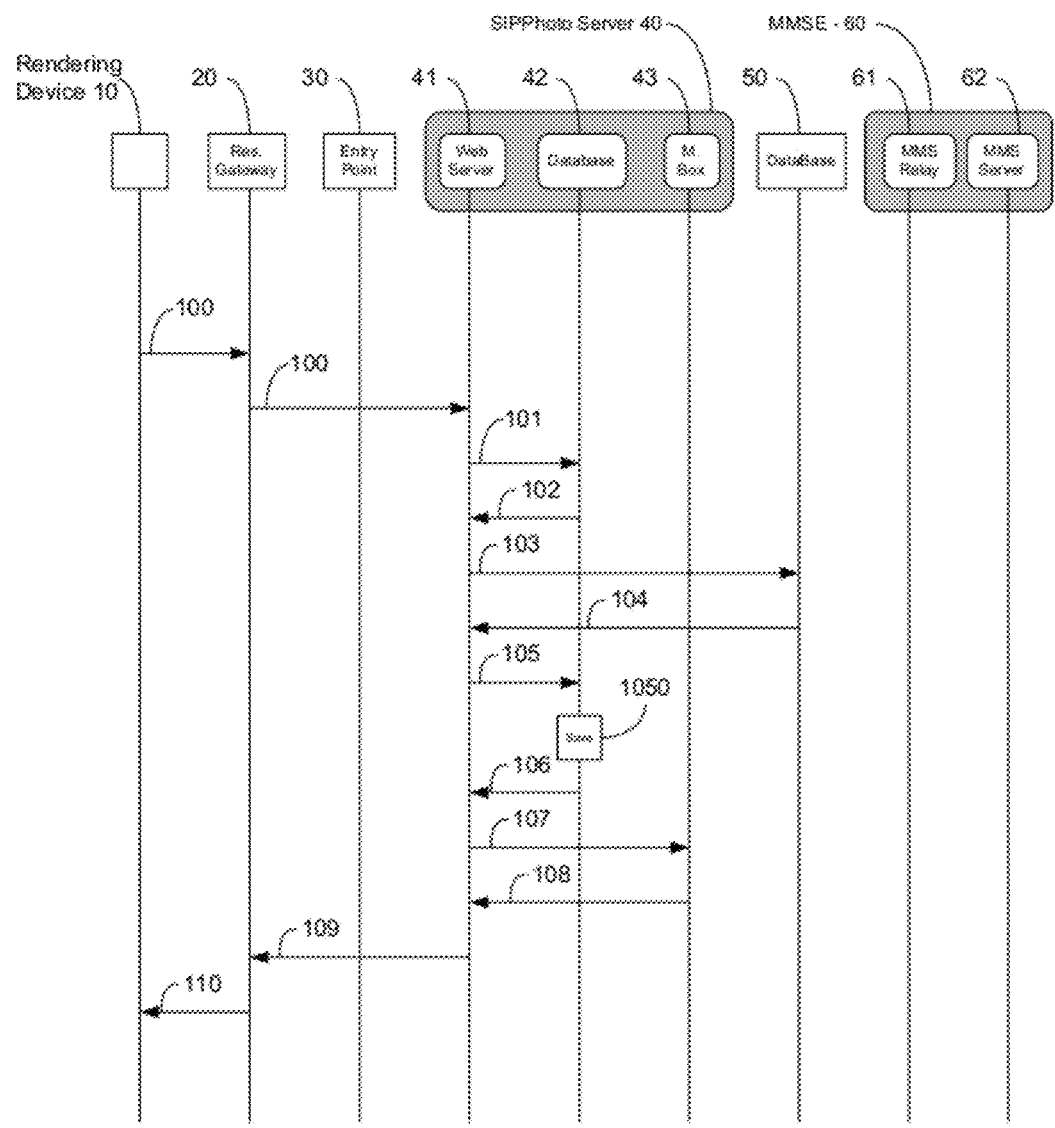
FIG. 4 describes a mode of implementation of the method.

Referring to FIG. 4, a description is provided of the phases constituting the first access to the web server of the SIPhoto server 40 by the frame 10. It is assumed that the frame 10 is configured by its owner to access a URL, this URL corresponding to the homepage of the Web server 41 related to the method of the present disclosure.

This first access of the frame 10 enables the customer's identifier ID to be retrieved from the public and dynamic IP address assigned to the residential gateway 20 through a query to the association database 50, and then enables the storage of the triplet {the public IP address of the residential gateway, AID and email address of the frame} in the database 42 of the SIPhoto server 40 so that there is no need to need to consult the association database 50 for each HTTP query regularly sent out by the frame 10 (at intervals which may be of the order of one minute). In this embodiment, during the first access to the web server 41, a script consults the electronic mailbox 43 associated with the photo frame. Since this box 43 is empty, the content of a Web page is displayed by default. This page incorporates an automatic refresh mechanism so that the frame regularly accesses the Web server 41 of the SIPhoto server 40.

In other words, when the HTTP GET query (100) is presented to the web server 41 (by means of the gateway 20), this server retrieves the source IP address of the packet corresponding to the public IP address allocated to the gateway 20. A script accesses the database (101) 42 using the IP address of the gateway as the entry key to retrieve the number of the frame (E164). Since this is the first consultation query, there is no correspondence available (102). Hence, the script follows up with a consultation (103) of the association database 50 to obtain (104) the customer's identifier AID from the public IP address of the gateway 20. If the AID is returned (104), the script of the Web server 41 again consults (105) the database DB 42 with an entry key that is {gateway IP address; AID}. This pair enables the reliable retrieval of the number E164 of the frame 10 of the Internet customer identified by AID. This information is saved (1050) in the database DB 42 to limit exchanges with the association database 50. The number E164 is returned to the Web server which takes charge of the task of consulting (107) the electronic mailbox by means of the address "e164@frame.serviceprovider.com". Since there is no message (108), a default web page is generated and returned (109,110) to the frame 10 which displays it. This page has a refresh mechanism enabling the frame to regularly consult the Web server 41.

Figure 5:
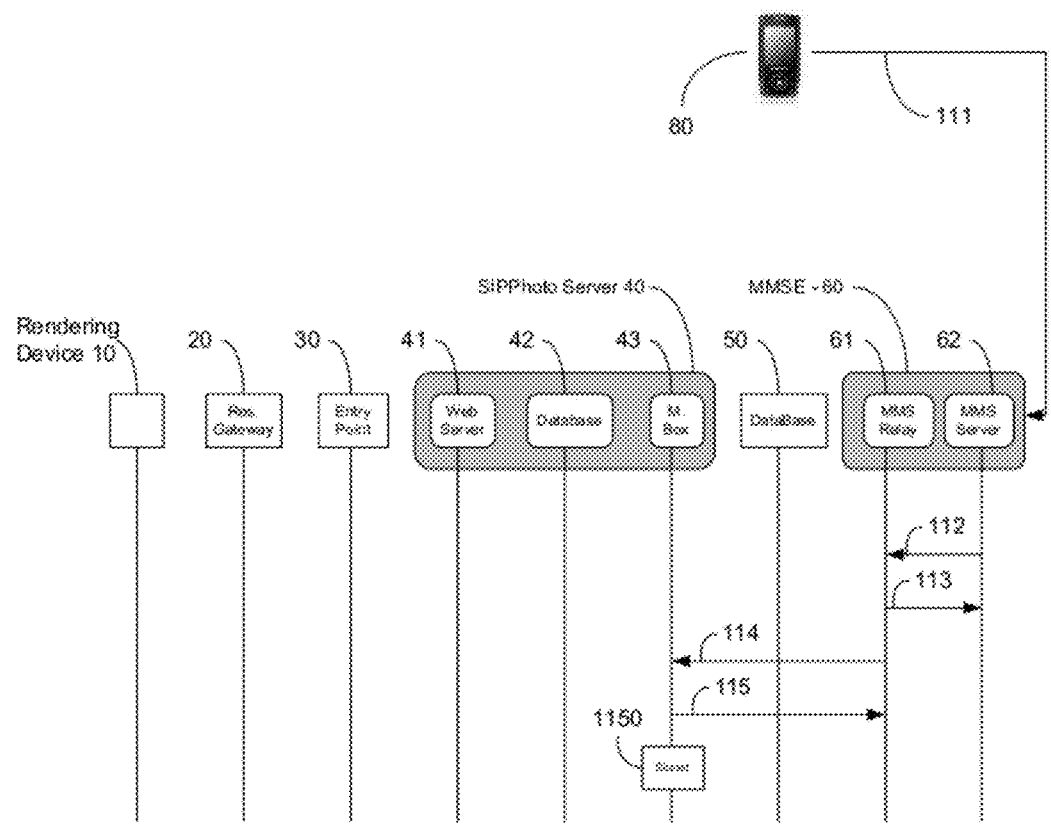
FIG. 5 describes the steps of storage of an electronic email message in the electronic mailbox associated with the frame.

Referring to FIG. 5, a macroscopic description is given of the sending (111) of an MMS from a GSM terminal 80 to a MMS management centre 60. In this case, the caller should key in the email address allocated to the photo frame. The MMS is transmitted (111) to the MMSC 62 (MMS reception centre) which detects the fact that the MMS is intended for an electronic mailbox and not a telephone number. The "MMS relay" function 61 is therefore used (112, 113) and the MMS is sent (114,115) in email form, with attachments, to the domain name server "frame.serviceprovider.com" at which it is stored (1150).

Thus, for example, from a mobile 80, a user takes a vacation photo and sends it (111) through an MMS to the address "e164@frame.serviceprovider.com". The MMS is sent (111) to the MMSC 62 of the caller's mobile operator. This caller relays it (112) through his MM3 interface (61) and the SMTP Protocol to the email server 43 of the domain name server 40 "frame.serviceprovider.com" (the different acknowledgement phases are not mentioned so as to simplify the illustration of the exchanges).

Figure 6:
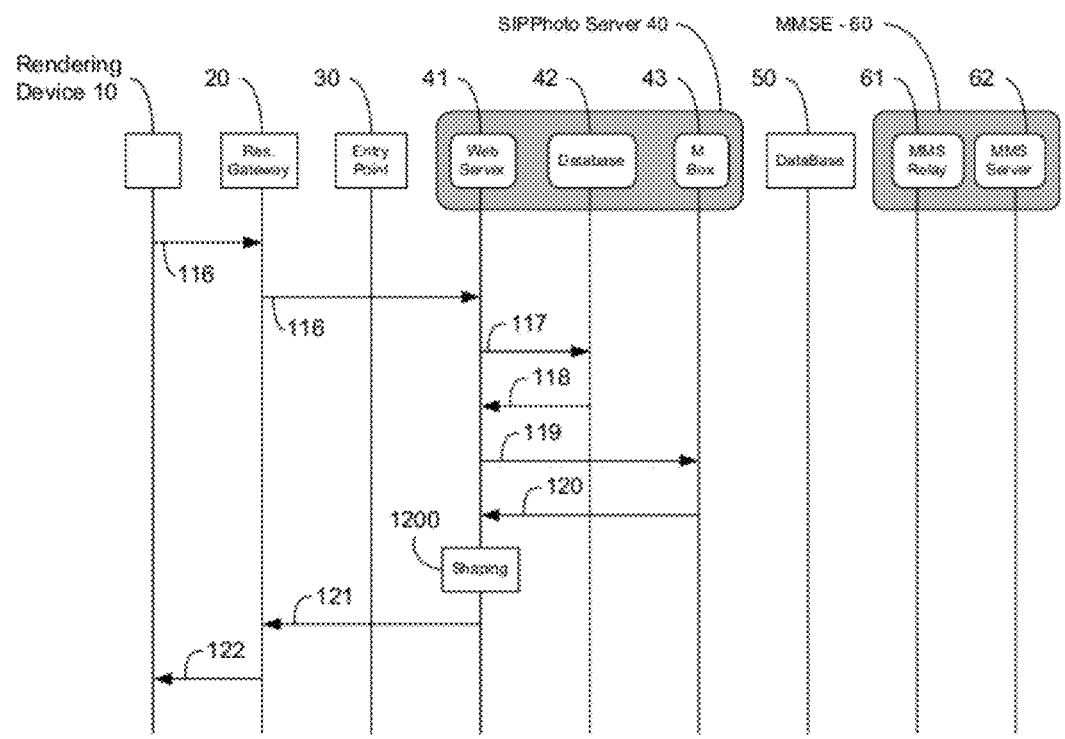
FIG. 6 describes the steps leading to the retrieval of the email.

Referring to FIG. 6, a description is provided of the phase of retrieval of the email (corresponding to the MMS transmitted here above, as described in FIG. 3). As in the first connection phase, the frame 10 links up (116) via HTTP to the Web server 41 of SIPhoto 40. The public IP address of the residential gateway (source IP address of the packet conveying the GET HTTP query) enables the retrieval (117, 118), in the database 42 linked to the method of the present disclosure, of the email address of the photo frame (without interrogating the association database 50). A script at the Web server 41 consults (119) the electronic mailbox 43 associated with the photo frame and checks to see whether an email message is present (120). Another script shapes (1200) this email message so that it is readable in "web" mode by the photo frame 10. The frame 10 receives (122) the response from the web server 41 through (121) the gateway and displays the corresponding page. This page displaying the MMS also enables automatic refreshing so that the photo frame 10 regularly consults the Web server 41 of SIPhoto 40. Different algorithms may be chosen by the customers to display the email messages and, if necessary, destroy them after display.

Thus, in other words, during the automatic refreshing of the web page (for example by means of a HTTP customer module present in the frame) the number E164 corresponding to the frame 10 is retrieved directly in the database DB 42 of the server SIPhoto 40 from the IP address of the gateway 20, thus preventing an overload on the association database 50 {the triplet (IP address, AID, E164) having been marked as being valid during the first loading of the Web page}. The script of the Web server 41 then consults the corresponding mailbox 42 corresponding to the frame 10 "e164@frame.serviceprovider.com". The email is returned to the web server 41 which shapes it and returns it to the frame 10 which displays it. This read cycle is automatically refreshed by the web page itself. The email can be marked as having been read. A specific algorithm can read all the mail in the box sequentially, starting from a certain date, etc.

1. Management of Several Rendering Devices

In one complementary embodiment of the disclosure corresponding to the case where the user has several rendering devices available, two possibilities are offered.

1. If the user wishes that each frame should be independent and that each of these frames should receive its own data to be displayed, an email address is assigned to each frame. It is therefore necessary to provide an additional piece information needed for the identification of the frame within the private network. This information may be the hardware address (also called a "mac" address of each of the frames. This operation may be performed when taking out a subscription to the service. It is used to carry out appropriate routing (corresponding mac address/email address).

2. If the user wishes that all the frames should display the same information at the same time, it is not necessary to carry out modifications of the implementation inasmuch as each frame will access the SIPhoto as if there were only one frame. The residential gateway takes charge of the address translation to route the responses to the HTTP queries formulated by the different frames.

2. Other Optional Characteristics and Advantages

Figure 7:
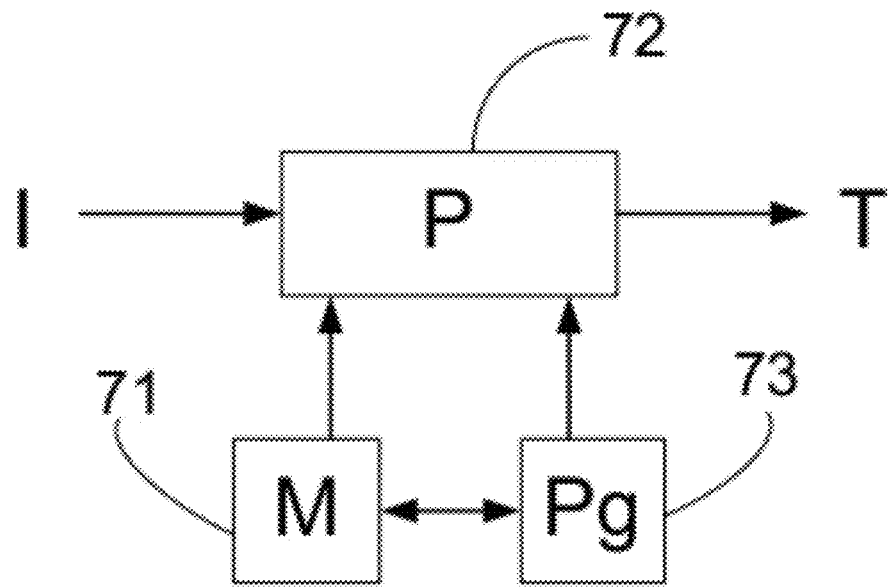
FIG. 7 provides a brief description of an embodiment of a device for implementing the method according to an aspect of the disclosure.

Referring now to FIG. 7, we present an embodiment of a device implement the addressing method.

Such a device has a memory 71 consisting of a buffer memory, a processing unit 72 equipped for example with a microprocessor μP and driven by the computer program 73 implementing the addressing method.

At initialization, the instructions of the computer program code 73 are for example loaded into a RAM and then executed by the processor of the processing unit 72. The processing unit 72 inputs at least one item of information 1 to be transmitted (such as a voice query for voice transcription). The microprocessor of the processing unit 72 implements the steps of the above-described addressing method according to the instructions of the computer program 73 to deliver a piece of processed information T (such as a transcribed text). To this end, the addressing device includes, in addition to the buffer memory 71, query and response formulating means and information-processing means enabling especially the execution of the method. These means are driven by the microprocessor of the processing unit 72.

Although the present disclosure has been described with reference to one or more examples, workers skilled in the art will recognize that changes may be made in form and detail without departing from the scope of the disclosure and/or the appended claims.

What is claimed is:

1. A method for updating a data-rendering device connected to a communications network by an intermediate device, the method comprising:
    associating in a database connected to said communications network at least one identifier, preliminarily assigned to said intermediate device, with a reception electronic address that is assigned in said intermediate device to said data rendering device, wherein said at least one identifier belongs to the group consisting of:
    one dynamic connection identifier of said intermediate device; and
    one user account identifier (AID).

2. The method according to claim 1, comprising:
    a preliminary step of obtaining said dynamic connection identifier by using said account identifier (AID) of said user associated with a connection of said intermediate device to said wide area network;
    a step of storing, in an entity of said wide area network, of a set of digital data comprising at least said dynamic connection identifier and said account identifier of said associated user.

3. The method according to claim 2 comprising, subsequently to said step of associating:
    a step of verifying the existence of a message associated with said reception electronic address, delivering an information on existence;
    a step of transferring an item of information representative of said information on existence to a storage space accessible to said rendering device.

4. The method according to claim 3 wherein said piece of representative information is a file that can be rendered on said device and is representative of said message.

5. The method according to claim 1, wherein said reception electronic address comprises a mail address.

6. The method according to claim 1, wherein said reception electronic address comprises a Session Initialization Protocol (SIP) address.

7. The method according to claim 1 wherein the communications network comprises an Internet IP network and said reception electronic address comprises a mail address allowing the data-rendering device to be updated by receiving messages from the Internet IP network, said messages being addressed to said mail address.

8. The method according to claim 1 wherein said reception electronic address comprises at least a telephone line number assigned to a user.

9. A telecommunications system comprising:
    a data-rendering device connected to a communications network by an intermediate device, a reception electronic address being assigned, in said intermediate device, to said data-rendering device; and
    means for associating at least one identifier, preliminarily assigned to said intermediate device, with said reception electronic address, said at least one identifier belonging to the group consisting of:
    one dynamic connection identifier of said intermediate device; and
    one user account identifier (AID).

10. A device for updating a data-rendering device connected to a communications network by an intermediate device, a reception electronic address being assigned, in said intermediate device, to said data-rendering device, the device comprising:
    means for associating at least one identifier, preliminarily assigned to said intermediate device, with said reception electronic address, said at least one identifier belonging to the group consisting of:
    one dynamic connection identifier of said intermediate device; and
    one user account identifier (AID).

11. A non-transitory computer-readable carrier comprising a computer program product stored thereon, the computer program product comprising program code instructions for execution of a method for updating a data-rendering device connected to a communications network by an intermediate device, a reception electronic address being assigned, in said intermediate device, to said data-rendering device, when the product is executed on a computer, wherein the method comprises:
    associating at least one identifier of said intermediate device, preliminarily assigned to said intermediate device, with said reception electronic address, said at least one identifier belonging to the group consisting of:
    one dynamic connection identifier of said intermediate device; and
    one user account identifier (AID).

* * * * *